April 4, 1967 V. A. HOOVER 3,312,916
ACTUATOR WITH LIMITING MECHANISM AND TORQUE LIMITING CLUTCH
Original Filed Sept. 5, 1957
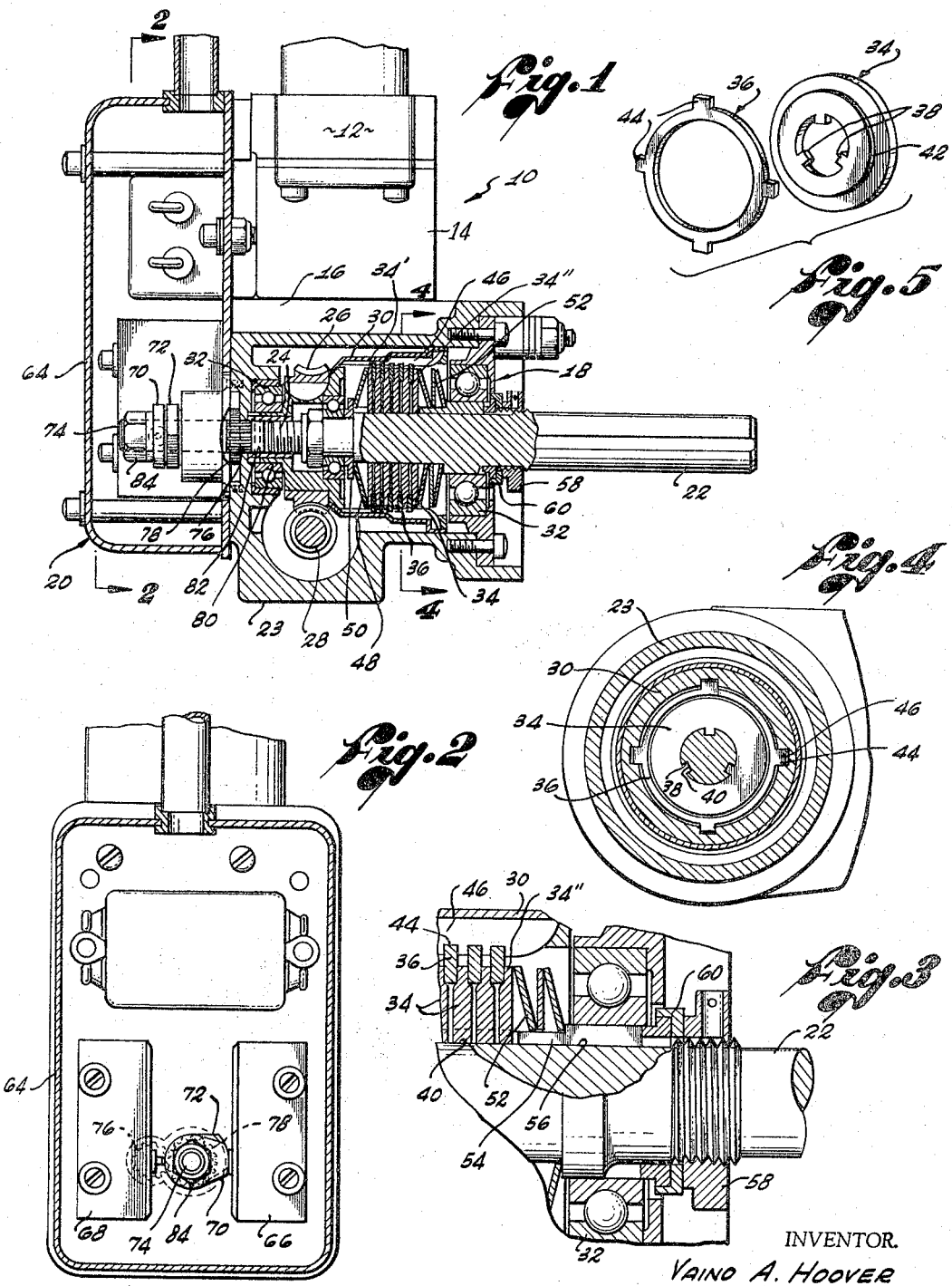
INVENTOR.
VAINO A. HOOVER
BY *Fulwider Mattingly & Huntley*
ATTORNEYS

United States Patent Office 3,312,916
Patented Apr. 4, 1967

3,312,916
ACTUATOR WITH LIMITING MECHANISM AND
TORQUE LIMITING CLUTCH
Vaino A. Hoover, 1433 San Vicente Blvd.,
Santa Monica, Calif. 90402
Original application Sept. 5, 1957, Ser. No. 682,121, now Patent No. 3,087,105. Divided and this application June 13, 1962, Ser. No. 202,169
5 Claims. (Cl. 335—74)

This invention relates generally to electromechanical actuators, and more particularly to an actuator of this type having a rotational output and incorporating means for limiting the torque applied to its output shaft and means for limiting the movement of that shaft.

The present application is a division of my prior copending application entitled, Electromechanical Actuator with Limiting Mechanism, Ser. No. 682,121, filed Sept. 5, 1957, now Patent No. 3,087,105.

Electromechanical actuators have been found to be very effective means for actuating movable parts. One of the principal applications of these actuators is in modern aircraft, where they are used for such purposes as the actuation of trim tabs and the like. Such actuators also serve effectively in many other applications, including industrial automation.

In most applications of actuators of the subject type, it is an operational requirement that movement of the output shaft be accurately controlled within predetermined limits. To achieve this, the actuator is equipped with a limiting mechanism, which serves to terminate the operation of the actuator in a given direction, when the driven device has reached a corresponding limit position. It will be readily appreciated that, particularly in aircraft applications where a malfunction is potentially disastrous, the operation of the actuator must be as foolproof as possible. Moreover, the operation of the limiting mechanism is especially crucial. A malfunction of that mechanism may, for instance, cause jamming of the driven device or overheating of the drive motor, besides possible mechanical failure of any one of the parts of the actuator and driven device due to excessive torque.

Therefore, by way of summary, it is extremely important in such actuators not only that the limiting mechanism be as troublefree as possible, but also that additional protective means be provided, which will eliminate the possibility of excessive torques and resulting damage to both the actuator and the driven device in the event a malfunction should occur. Such protective means may in some cases be provided externally of the actuators as, for instance, between the output shaft of the actuator and the driven device. However, in most cases, it is desirable, because of practical considerations, to incorporate them in the actuator itself.

Another requisite feature of actuators in aircraft and many other applications is that they be constructed and arranged so that the limit positions of the output shaft can be adjustably established and coordinated with the mechanical limits of the driven device. This is necessary for the reason that the part to be actuated normally has some manufacturing tolerances. Moreover, additional tolerances frequently develop during assembly. To compensate for such tolerances and insure that the limit positions of the actuator and its associated driven device coincide, it is necessary to provide for final adjustment after assembly. In somewhat similar regard, it is frequently desirable to adjustably establish the maximum torque which is applied to the output shaft. Some driven devices are highly susceptible to damage by virture of excessive torques, and, therefore, in those cases accurate control of the maximum torque is of vital importance. Moreover, an actuator with a torque adjustment feature is capable of being used in a variety of different applications.

Further operational requirements of such actuators in aircraft applications are that, in addition to the above capabilities, the device be sufficiently sturdy to withstand sustained vibration and rapidly fluctuating atmospheric conditions, and be relatively light in weight.

It is, therefore, a major object of this invention to provide an electromechanical actuator, which satisfies all of the above requirements.

Another, more specific object is to provide an electromechanical actuator with a limiting mechanism for controlling movement of its output shaft within predetermined limits, the mechanism incorporating means for protecting both the actuator and the driven device from damage in the event of a malfunction of the limiting mechanism.

It is a further object of this invention to provide an actuator of the type, described, having an improved torque limiting clutch for limiting the torque applied to the output shaft.

A related object is to provide an actuator of the type described with a torque limiting clutch, which is conveniently adjustable from the exterior of the actuator for accurately establishing the maximum torque applied to the output shaft.

Another object of this invention is to provide an electromechanical actuator capable of accomplishing the foregoing objects, and further characterized in that it is relatively small in size and light in weight, yet sufficiently rugged to withstand the rigors of use in aircraft installation.

These and other objects, features, and advantages of the invention will be better understood by referring to the following detailed description taken in conjunction with the accompanying drawing of an illustrated embodiment thereof, in which:

FIGURE 1 is a side view, partly in elevation and partly in section, showing the actuator of the invention;

FIGURE 2 is a sectional view taken along the line 2—2 of FIGURE 1 and illustrating in elevation certain operating parts of the limiting mechanism of the actuator;

FIGURE 3 is an enlarged sectional view of the area encircled by the line 3 in FIGURE 1, showing the adjustable feature of the torque limiting clutch;

FIGURE 4 is a sectional view taken on the line 4—4 of FIGURE 1; and

FIGURE 5 is an exploded view of certain cooperating parts of the torque limiting clutch.

Referring to the drawing, and in particular to FIGURE 1 thereof, numeral 10 designates the actuator of the invention. The actuator 10 includes generally a reversible electric motor 12, a magnetic clutch and brake unit 14, reduction gearing 16, a torque limiting clutch 18, and a limiting mechanism 20.

Briefly, the motor is adapted to be energized so as to alternately drive the output shaft 22 in clockwise and counterclockwise directions, as viewed from the right hand end of FIGURE 1, and thereby move a driven device (not shown) between extended and retracted positions. Connected to the output shaft 22 at its inner end is the limiting mechanism 20, which serves to de-energize the motor 12 when the output shaft has moved in either direction to limit positions, which correspond to the mechanical limits at the extended and retracted positions of the driven device. The function of the torque limiting clutch during such operation is, as suggested above, to insure that the torque applied to the output shaft 22 does not exceed a predetermined level. It is to be noted at the outset that the present invention is primarily concerned with the constructions and arrangements and operational features of the torque limiting clutch 18 and the limiting mechanism 20.

The function of the magnetic clutch and brake unit 14 is to detachably couple the motor 12 to the reduction gearing 16. A unit of the type disclosed in my U.S. Patent No. 2,618,368 entitled, Magnetic Clutch, and issued Nov. 18, 1952, may be used to advantage for this purpose. As the patent reveals, the main advantage of the magnetic clutch and brake unit is to automatically operate when the output shaft has been driven to a desired position and the motor de-energized, to hold the shaft against movement under the influence of externally applied loads. The unit 14 has further utility in selected applications, where it may be automatically actuated to detach the motor from its reduction gearing and thereby permit two actuators, when driven as a pair, to be driven by one motor, should one motor fail.

The torque limiting clutch 18 is contained within a housing 23 which rotatably mounts the output shaft 22. Freely rotatable on the output shaft 22 adjacent its inner end 24 is a worm wheel 26 which, in turn, is driven by a cooperating worm 28 coupled to the reduction gearing 16. A mounting sleeve 30 is fixed to one face of the worm wheel 26 and extends axially therefrom toward the driving end of the shaft 24 in concentric relationship therewith. It will be understood that the shaft 22 and the wheel-sleeve assembly 26, 30 are rotatable both with respect to the housing 23 and with respect to one another. Bearing support of these members is enhanced by a plurality of ball bearings 32.

Coupling of the shaft 22 to the sleeve 30 is achieved by means of a plurality of cooperating clutch disks including shaft disks 34 and sleeve disks 36. The disks 34 and 36 are disposed alternately in face to face relation and keyed to the shaft 22 and sleeve 30, respectively. By pressing the engaging faces of the disks 34 and 36 in frictional engagement with one another, a frictional coupling between the parts is afforded.

Each of the shaft disks 34 has an inside diameter just slightly greater than the diameter of the shaft 22 and is receivable thereon. In order to key the disks 34 to the shaft, the former are provided with a plurality of angularly spaced and radially inwardly extending splines or fingers 38 received in mating splineways or grooves 40 in the shaft. As may be seen in FIGURE 5, each of the shaft disks 34 is formed with annular shoulders 42 (or a single shoulder in the case of the end disks) adjacent their peripheries. Supported on the shoulders of adjacent disks 34 are the sleeve disks 36, which have an internal diameter approximately equal to the diameter of the annular shoulders 42. Referring to FIGURE 3, it may be seen that the thickness of each sleeve disk 36 is slightly greater than twice the width of a shoulder 42 on the shaft disk 34. Connection of the sleeve disks 36 to the sleeve 30 is achieved by providing a plurality of angularly spaced and radially outwardly extending splines or fingers 44 on the periphery of each disk 36 and mating splineways or grooves 46 in the inner periphery of the sleeve 30. Accordingly, the shaft disks 34 rotate with the shaft 22, whereas the sleeve disks 36 rotate with the sleeve 30.

Frictional engagement of the cooperating disks 34 and 36 is established by providing spring washers on the shaft 22 at opposite ends of the disk configuration. More specifically, a spring washer 48 is provided at the inner end of the configuration and is compressed between a flanged collar 50 secured on the shaft 22 and the terminal shaft disk 34'. At the opposite end of the configuration, a spring washer 52, here shown as a double washer for added resiliency, is disposed in compression between the shaft disk 34" and a plurality of keys 54. The keys 54 are axially movable in axial grooves 56 in the periphery of the shaft, so as to enable them to be moved to adjust the compression of the springs 48 and 52. As will be appreciated, adjusting the compression of the springs, in turn, correspondingly changes the frictional coupling between the sleeve 30 and output shaft 22.

Movement of the keys 54 in their respective grooves 56 is effected by means of a flanged nut 58 threadedly engaged on the output shaft 22. The annular end face of the nut 58 bears against the outer one of a pair of rings 60 interposed between the keys 54 and nut. Tightening of the nut 58 on the shaft in opposition to the force of the springs 48 and 52, of course, serves to advance the keys 54 to the left in the drawing and increase the torque level at which slippage of the clutch will take place, whereas backing off the nut has the reverse effect.

It will be understood that in normal operation of the actuator 10, the frictional engagement of the disks 34 and 36 serves to couple the sleeve 30 to the output shaft 22. Accordingly, when the motor 12 operates to rotate the worm 28 and drive the worm wheel 26, movement of the output shaft 22 takes place. However, when the torque load on the shaft 22 increases above a predetermined level, adjustably established by varying the spring pressure in the above manner, slippage takes place between the disks 34 and 36. In this latter condition, the wheel-sleeve assembly 26, 30 continues to rotate, but the output shaft 22 remains stationary. In order to permit slippage between the disks 34 and 36 without damage to them, adjacent disks preferably are made of different materials having good bearing characteristics as, for example, bronze and steel.

The limiting mechanism 20 is contained within a housing 64 secured to the housing 23 at the end opposite the output shaft 22. In general, the mechanism 20 comprises a pair of switches 66 and 68 electrically connected to the motor 12 and adapted to be actuated by associated cams 70 and 72 at predetermined limit positions of the actuator to de-energize the motor.

Mounted within the housing 64 at a location parallel to, but offset from, the axis of the worm wheel 26 and output shaft 22 is a cam shaft 74. The shaft 74 is driven by the worm wheel 26 through a pair of meshing spur gears 76 and 78, the gear 76 being secured to the worm wheel 26 and the gear 78 being fixed on the end of the cam shaft 74. As may be seen in FIGURE 1, the worm wheel 26 is formed with a drum portion 80, which projects axially from the face of the wheel opposite the mounting sleeve 30. A short stub shaft 82 carrying the spur gear 76 at one end is received at its opposite end within the drum portion 80 and pin connected thereto. With this arrangement, it will be noted that the cam shaft 74 rotates under the influence of the worm wheel 26, even when the output shaft 22 is stationary and slippage is taking place in the torque limiting clutch 18.

The cams 70 and 72 are releasably secured on the cam shaft 74 in side by side relation. In the illustrative case, the cams are held in place by a nut 84 threadedly engaged on the end of the shaft 74 and urging them into forceful frictional engagement with one another and the stop shoulder on the shaft. To adjust the relative positions of the cams 70 and 72, it is simply necessary to back off the nut 84, thereby freeing them for relative movement on the shaft 22.

The switches 66 and 68 are mounted on the housing 64 and disposed with their actuating buttons in the movement paths of their associated cams 70 and 72, respectively. The switch 66 is connected to the energizing circuit of the motor, which produces clockwise rotation of the output shaft 22 and is arranged when actuated to de-energize that motor circuit. Likewise, the other switch 68 is connected in the counterclockwise circuit of the motor and arranged to de-energize that motor circuit.

By appropriate adjustment of the cams 70 and 72 on their shaft 74, the actuator 10 can be conditioned so that its clockwise and counterclockwise motions cease substantially at the moment the driven device reaches its mechanical limits. In this connection, when the motor 12 is energized to produce rotation of the output shaft 22 in a given direction, the worm 28 drives the worm wheel 26 and, in turn, the output shaft 22 through the torque limiting clutch 18. During such operation, the worm wheel 26 also drives the cam shaft 74 to move one of the cams toward its associated switch. When the cam engages its switch as, for example, in the manner illustrated in FIGURE 2, motor operation ceases, and no further shaft rotation in that direction can take place, as long as the switch is actuated. In the event of a failure of the limiting mechanism 20, as by malfunctioning of one of the switches 66 and 68, the torque limiting clutch 18 serves to protect the actuator, as well as the driven device, in the manner explained above. Moreover, the motor 12 will then continue to operate without damage to the various parts, until it is manually de-energized. In this situation, the cam shaft 74, of course, continues to rotate under the influence of the worm wheel 26, however, no damage to the limiting mechanism occurs, as the cams are shaped so as to permit them to move on past their respective switches. Upon remedying the malfunction, the cams, of course, can be readjusted to coordinate the limit positions of the actuator with the limits of the driven device, because the cams will be undamaged by such malfunction.

A feature of the present actuator is that adjustment of the cams to make the limit positions of the actuator correspond to the limits of the driven device, may be facilitated by making use of the torque limiting clutch 18. In this regard, the actuator is first operated to move the driven device into one of its mechanical limits in such a sequence that the limit is reached before the corresponding switch as, for example, the clockwise switch 66 is actuated by its cam 70. Once the mechanical limit is reached, the output shaft 22 is blocked, but because of the operation of the clutch 18, the cam 70 continues to move toward its switch 66. Upon switch actuation by the cam 70, the motor 12 is de-energized in the clockwise direction.

The next step of this adjustment procedure is to coordinate the counterclockwise limit position of the actuator to the opposite mechanical limit of the driven device. This may be done by operating the actuator in the counterclockwise direction with the cam 70 fixed in an adjusted position on the shaft, and the cam 72 either loose on the shaft or positioned so that the mechanical limit of the driven device is reached before the counterclockwise switch 68 is actuated. Just as the driven device reaches its opposite limit position, as evidenced by the torque limiting clutch 18 beginning to slip, the motor 12 is manually de-energized. The cam 72 is then moved into actuating relationship with its switch 68 and fixed on the shaft 74, whereupon the two cams will be matched with the limits of the driven device. Alternately, the final step may be accomplished by temporarily shorting out the switch 68 and positioning the cam 72 in actuating relationship with that switch. The actuator is next energized in a counterclockwise direction until the limit position of the driven device is reached. Since in this case the cam is already positioned, it is merely necessary as a final step to tighten the nut when the shaft is properly aligned.

In order that the switches will operate just slightly before the driven device actually moves fully into its limit positions, final precise adjustment of the cams 70 and 72 normally is accomplished manually. However, the adjustment feature described above is particularly advantageous in initially obtaining approximate coordination of the limit positions of the actuator with the mechanical limits of the driven device.

Because of the particular gear connection provided between the worm wheel 26 and the cam shaft 74, the shaft makes a complete revolution for every few revolutions of the output shaft 22. This stems from the fact that the illustrative embodiment of the invention has a fairly high step down gear ratio between its drive motor and output shaft. In some applications, it may be desirable to provide an output shaft with a greater range of travel. If so, this may be achieved by providing a suitable gear train between the worm wheel 26 and the cam shaft 74.

Although one embodiment of the invention has been illustrated and described with a certain degree of particularity, it will be understood that this was only by way of illustration and that various changes in the details of the construction and arrangement of the various parts may be made without departing from the spirit and scope of the invention.

I claim:

1. In an actuator having a reversible motor for moving a driven device between opposite mechanical limits, apparatus comprising:
   an output shaft adapted to be coupled to said driven device;
   a rotatable drive member coupled to said motor;
   a sleeve secured to said drive member and disposed in coaxial spaced relation with said shaft;
   a pair of shaft disks disposed around said output shaft and keyed thereto for rotation with said shaft;
   a sleeve disk interposed between said shaft disks and arranged with its opposite side faces in engagement with adjacent faces of said shaft disks, said sleeve disk being keyed to said sleeve for rotation therewith;
   spring means on said shaft yieldably urging the engaged faces of said shaft disks and sleeve disk into frictional contact, whereby said shaft rotates with said sleeve when the torque on said shaft is below a predetermined maximum; and
   a limiting mechanism associated with said motor and including mechanical means connected to and driven by said drive member independently of said shaft, said limiting mechanism having limiting means stopping said motor when said drive member has turned through the number of revolutions in a given direction necessary to move the driven device from one to the other of its mechanical limits.

2. In an actuator having a reversible motor for moving a driven device between opposite mechanical limits, apparatus comprising:
   a housing;
   an output shaft rotatably mounted in said housing with a portion projecting exteriorly thereof;
   a drive member rotatably mounted in said housing and coupled to said motor;
   a sleeve secured to said drive member and disposed in coaxial spaced relation with said shaft;
   slip clutch means coupling said sleeve to said shaft so that they rotate together when the torque on said shaft is below a predetermined maximum;
   means associated with said slip clutch means and accessible exteriorly of said housing for adjustably establishing said predetermined maximum torque; and
   a limiting mechanism associated with said motor and including mechanical means connected to and driven by said drive member independently of said shaft, said limiting mechanism having limiting means stopping said motor when said drive member has turned through the number of revolutions in a given direction necessary to move the driven device from one to the other of its mechanical limits.

3. In an actuator having a reversible motor for moving a driven device between opposite mechanical limits, apparatus comprising:
   a housing;
   an output shaft rotatably mounted in said housing with a portion thereof projecting exteriorly thereof;
   a drive member rotatably mounted in said housing, said member being rotatable about an axis oriented coaxial with that of said shaft;
   a sleeve secured to said drive member and disposed in coaxial spaced relation with said shaft;
   a pair of shaft disks mounted on said shaft in side-by-side relation and keyed thereto for rotation with said shaft;
   a sleeve disk disposed around said shaft and between said shaft disks in face-to-face engagement, said sleeve disk being keyed to said sleeve for rotation therewith;

means carried by said shaft and movable axially thereof for urging said engaged faces of said shaft disks and sleeve disk into forceful frictional contact, whereby said shaft rotates with said sleeve when the torque on said shaft is below a predetermined maximum;

means operatively associated with said urging means and accessible exteriorly of said housing for adjusting the force urging said engaged faces into such frictional contact;

and a limiting mechanism associated with said motor and including mechanical means connected to and driven by said drive member independently of said shaft, said limiting mechanism having limiting means stopping said motor when said drive member has turned through the number of revolutions in a given direction necessary to move the driven device from one to the other of its mechanical limits.

4. In an actuator having a reversible motor for moving a driven device between opposite mechanical limits, apparatus comprising:

an output shaft;
a rotatable drive member coupled to said motor;
slip clutch means coupling said drive member to said output shaft;
switch means for stopping operation of said motor;
a cam shaft, mechanical means connecting said cam shaft to said drive member, whereby said cam shaft is operated by said drive member;
and a pair of cams adjustably mounted on said cam shaft, each of said cams actuating said switch means when said drive member has turned through the number of revolutions in a given direction necessary to move the driven device from one to the other of its mechanical limits, said slip clutch means permitting continued rotation of said drive member and said cam shaft when said driven device is in its mechanical limits and said output shaft is blocked, whereby said cams may be adjusted on said cam shaft to produce actuation of said switch means coincidental with said driven device reaching its mechanical limits.

5. In an actuator having a reversible motor for moving a driven device between its mechanical limits, apparatus comprising:

an output shaft;
a drive member rotatably mounted on said output shaft and coupled to said motor;
a sleeve secured to one face of said drive member and disposed in coaxial relation with said output shaft, said sleeve having its inner periphery spaced from the periphery of said output shaft;
slip clutch means coupling said sleeve to said output shaft;
switch means for stopping operation of said motor;
a cam shaft, mechanical means connecting said cam shaft to said drive member, whereby said cam shaft is operated by said drive member;
and adjustable switch actuating means operable by said cam shaft to actuate said switch means when said drive member has turned through the number of revolutions in a given direction necessary to move the driven device from one to the other of its mechanical limits, said switch slip clutch means permitting continued rotation of said drive member when said driven device is in its mechanical limits and the output shaft is blocked, whereby the positions of actuation of said switch means may be correlated with the mechanical limits of said driven device.

References Cited by the Examiner

UNITED STATES PATENTS

| | | | |
|---|---|---|---|
| 2,411,739 | 11/1946 | Luehrs | 64—30 |
| 2,565,649 | 8/1951 | Chappell | 318—468 |
| 2,571,818 | 10/1951 | Blodgett | 200—47 X |
| 2,603,330 | 7/1952 | Isaacs | 192—142 |
| 2,778,472 | 1/1957 | Young | 64—30 X |
| 2,812,047 | 11/1957 | Smitzer | 192—142 |
| 3,059,484 | 10/1962 | Bohlman et al. | 318—469 X |

BERNARD A. GILHEANY, *Primary Examiner.*

O. L. RADER, *Examiner.*

R. COOKE, T. MACBLAIN, H. E. SPRINGBORN,
*Assistant Examiners.*